United States Patent Office 2,979,485
Patented Apr. 11, 1961

2,979,485

PROCESS OF TRIMERIZING ISOCYANATES

John Burkus, Pompton Plains, N.J., assignor to United States Rubber Company, New York, N.Y., a corporation of New Jersey No Drawing. Filed Mar. 26, 1957, Ser. No. 648,748

5 Claims. (Cl. 260—75)

This invention relates to an improved process of trimerizing organic isocyanates, particularly aromatic isocyanates.

While my method is applicable to the trimerization of aliphatic isocyanates, the aliphatic isocyanates are in general readily trimerized by prior art methods, and the advantages of using the method of my invention are usually small in such cases.

Prior art methods for making aromatic isocyanate trimers have all been characterized by relatively high temperatures, long reaction times, and low yields. It has now been found that if the trimerization is carried out with the aid of (A) an epoxy compound and (B) a tertiary amine, quantitative yields of the trimer are obtained in a short time under mild reaction conditions, a result that is not obtainable with the use of the epoxy compound alone, or with the tertiary amine alone. The trimerization may be initiated at room temperatures, e.g., 20–25° C., or lower, and proceeds rapidly without the need of applying external heat.

The reaction which occurs may be represented by the following equation:

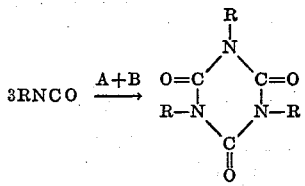

in which RNCO is an organic isocyanate, preferably an aromatic isocyanate, i.e., one in which the —NCO group is attached to a nuclear carbon atom in an aromatic ring system; and the product, a trimer of the isocyanate, is an isocyanurate. The substances A and B, which act catalytically and may be used in relatively small amounts, are respectively (A) an epoxy compound containing the atom grouping

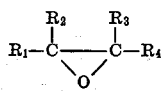

in which $R_1$, $R_2$, $R_3$, $R_4$ represent hydrogen or a hydrocarbon radical, and (B) a tertiary organic amine.

In the aromatic isocyanates to which my method is particularly applicable, the radical R to which the isocyanate group is attached may be any of the aromatic carbon ring systems, such as phenyl, naphthyl, anthryl. The radical R may also comprise other substituents in its ring system, the nature of such substituents being limited only in that they must be substantially unreactive with the isocyanate group, the epoxy compound, and the amine under the conditions of the trimerization reaction. In particular, the radical R with its attached isocyanate group may form a part of a polymeric molecule, e.g., such as is formed by the action of an excess of an aromatic diisocyanate with a polyester having terminal hydroxyl groups.

The compound designated "A" in the reaction scheme above may be ethylene oxide, or any of its derivatives formed by substituting one or more hydrocarbon radicals for one or more of the four hydrogen atoms. I usually prefer to use one of the lower members of the family, such as ethylene oxide itself, propylene oxide, or butylene oxide, because of the ready availability of these members, and because of their volatility, which facilitates recovery of the product. Mixtures of two or more members of the family may be used. The amount of the material "A" required to produce the beneficial results of my invention is small, as little as 0.1 to 2 moles per 100 moles of isocyanate usually being sufficient. However, the amount is not critical, and larger proportions may be used without harmful effects.

The tertiary amine "B" in the reaction scheme may be any compound containing a nitrogen atom bonded to three aliphatic carbon atoms, and containing no groups reactive with isocyanate under the conditions of the trimerization reaction. Examples of such amines are triethylamine, tripropylamine, N,N'-dimethyl piperazine, N-methyl piperidine, N-methylmorpholine, diethylcyclohexylamine, tetramethyl ethylene diamine, pentamethyl diethylene triamine, hexamethyl triethylene tetramine, di(beta-diethyl-aminoethyl)-adipate. Mixtures of such amines may be used. The amount of the amine required is small, as little as 0.1 to 2 moles per 100 moles of isocyanate being sufficient; larger proportions may be used without harmful effects. In this case, as in the case of the epoxy compound, the lower and more volatile members of the family are usually preferred.

The reaction may be carried out either in the presence or in the absence of a solvent, and the order in which the components "A" and "B" are added to the isocyanate is immaterial. Use of a solvent is sometimes advantageous, to moderate the speed of the reaction by dilution and by reflux distillation of the solvent, and to facilitate purification of the product. If a solvent is used, its choice is governed by the following considerations: (1) it should dissolve all of the reactants; (2) it should not react with the reactants or the product (except of course that the component "A" or "B," or a mixture of the two, may act as the solvent); (3) it should not unduly retard the rate of reaction; and (4) it should preferably be easily separable from the reaction product. In connection with item (3), it has been observed that the solvent exerts a noticeable specific effect on the reaction rate, toluene giving a higher rate than ethyl ether, for example. In connection with item (4), it is advantageous to use a solvent which is relatively volatile, and which does not dissolve the product. Thus, while dimethylformamide could be used in place of toluene in Example 1 below, the latter is preferred, since the former is a solvent for the triphenyl isocyanurate formed, which is insoluble in toluene.

The following examples illustrate the operation of my invention.

Example 1.—Trimerization of phenyl isocyanate

Into a 125 ml. Erlenmeyer flask were charged 25 ml. of dry toluene, 20 ml. of phenyl isocyanate (density 1.09) and 0.5 ml. of triethylamine. Ethylene oxide was bubbled through the solution and a highly exothermic reaction ensued (the flask had to be cooled in a cold water bath). After about 20 minutes, a voluminous white precipitate formed rapidly. This was filtered, dried, washed with toluene and air-dried again. About 20 grams of material were collected which melted at 268° C. (uncorrected) and gave the following analytical results:

|  | Percent N | Percent C | Percent H | Mol. Wt. |
|---|---|---|---|---|
| Found | 11.86 | 70.68 | 4.31 | 326 |
|  | 11.74 | 70.73 | 4.33 | 370 |
|  | 11.75 |  |  |  |
| Theoretical (for phenyl isocyanate trimer, recorded M.P. 270–280° C.) | 11.76 | 70.57 | 4.23 | 357 |

Example 2.—Trimerization of para-tolyl isocyanate

Into a 50 ml. Erlenmeyer flask were charged 5.5 grams of para-tolyl isocyanate and 5 ml. of propylene oxide. Upon the addition of 1 ml. of triethylamine a precipitate formed within a few seconds. About 5.5 grams of material were obtained which melted at 255–258° C. (uncorrected) and gave the following analytical results:

|  | Percent C | Percent H | Percent N |
|---|---|---|---|
| Found | 72.31 | 5.36 | 10.41 |
|  | 72.26 | 5.45 | 10.42 |
| Theoretical (for para-tolyl isocyanate trimer) | 72.16 | 5.30 | 10.52 |

Example 3.—Trimerization of a urethano-isocyanate-preparation of tri-(urethanotolyl) isocyanurate (a) Into a 250 ml. 2-necked round bottom flask were charged 50 ml. of dry toluene, 12.2 grams (0.07 mole) of 2,4-toluene diisocyanate, 5.8 grams (0.08 mole) of n-butanol, and 2 ml. of triethylamine. The contents of the flask were protected by a stream of dry nitrogen. After 30 minutes of reaction, the diisocyanate was substantially completely converted to the corresponding urethano-monoisocyanate by addition of butanol to one isocyanate group in each molecule of the original diisocyanate.

(b) A slow stream of ethylene oxide was passed through the reaction mixture for about 20 minutes, and it was allowed to stand at room temperature. Within 4 hours precipitation appeared to be complete. The solution was filtered, and the solid was washed with toluene and dried. A yield of 17 grams was obtained which gave the following analytical results:

|  | Percent C | Percent H | Percent N |
|---|---|---|---|
| Found | 62.29 | 6.43 | 11.52 |
|  | 62.37 | 6.53 | 11.53 |
| Theoretical (trimerized urethano isocyanate) | 62.88 | 6.50 | 11.29 |

Example 4

The table below shows the results obtained when phenyl isocyanate was treated with various tertiary amines with and without the addition of propylene oxide. The reactions were carried out in 25 ml. Erlenmeyer flasks at room temperature and 15 ml. of ethyl ether was used as solvent. After standing at room temperature for about 20 hours, the reaction mixtures were filtered. In each instance 0.046 mole (5.5 grams) of phenyl isocyanate and 0.046 mole of tertiary amine was used and, when used, 0.046 mole of propylene oxide were added to the reaction mixture.

The products were not recrystallized, the melting points being taken after washing with toluene and air drying.

| Amine | Propylene Oxide | Yield | Uncorrected M.P. of Product, °C. | Product |
|---|---|---|---|---|
| A | none | 200 mg. | 170 | dimer. |
| B | none | 150 mg. | 170 | Do. |
| C | none | trace |  |  |
| D | none | trace |  |  |
| A | Yes | 5.5 g. | 267–269 | trimer. |
| B | Yes | 5.5 g. | 258–262 | Do. |
| C | Yes | 300 mg. | 266–268 | Do. |
| D | Yes | 4.5 g. | 263–266 | Do. |
| none | Yes | 100 mg. | 235–238 | diphenyl-urea. |

A = N-methylmorpholine.
B = Triethylamine.
C = Diethylcyclohexylamine.
D = Di(beta-diethylaminoethyl) adipate.
175° C. = Recorded melting point of phenyl isocyanate dimer.
238–240° C. = Recorded melting point of diphenylurea.
270–280° C. = Recorded melting point of phenyl isocyanate trimer.

It will be noted that the desired trimer is obtained in appreciable amount only when both the propylene oxide and the tertiary amine are present. The invention does not reside in the selection of the aromatic isocyanate, many of which are known and undergo trimerization, and may be used in place of those in the examples, but in the combination use of the epoxy compound and the tertiary amine to assure more rapid reaction and better yields of trimer.

Example 5

The tri-(urethanotolyl) isocyanurate prepared as in Example 3 may be heated at 180–200° C., whereupon the urethane groups lose butanol and become isocyanate groups, thus forming a tri-(isocyanatotolyl) isocyanurate.

Example 6

A polyester with a molecular weight of about 2000 having a predominantly hydroxyl end-groups was made in known manner by the reaction of adipic acid with a mixture of glycols containing 80% by weight of ethylene glycol and 20% by weight of propylene glycol. The polyester was modified by reaction with 2,4-toluene diisocyanate in the proportions of 2.2 moles of diisocyanate to one mole of polyester. To 25 grams of the diisocyanate-modified polyester there were added one milliliter of triethylamine and one milliliter of propylene oxide. After standing at room temperature for several hours, the mixture was found to have solidified to form a polymeric material which was insoluble in all of a large number of organic solvents, including dimethylformamide, benzene, toluene, etc.

Having thus described my invention, what I claim and desire to protect by Letters Patent is:

1. A method for the trimerization of an aromatic mono-isocyanate RNCO to form an isocyanurate having the formula

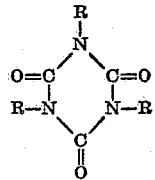

which comprises mixing with said isocyanate as a catalyst at least 0.1 mole per 100 moles of said isocyanate of each of (A) an epoxy compound having the formula

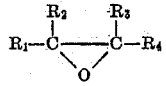

and (B) a tertiary amine, and maintaining the mixture at a temperature of from 0° C. to 50° C. until the trimerization reaction is completed, wherein R is an aryl radical having no substituent which is reactive with the isocyanate group, the epoxy compound, or the amine under the conditions of the trimerization reaction, and $R_1$, $R_2$, $R_3$ and $R_4$ are each selected from the group consisting of hydrogen atom and alkyl radicals, the compounds (A) and (B) containing no groups reactive with the isocyanate under the conditions of the trimerization reaction.

2. A method as set forth in claim 1, in which the reaction mixture includes an inert organic solvent for said mono-isocyanate, said solvent being one in which the said isocyanurate is substantially insoluble.

3. A method for making a tri-(urethanoaryl) isocyanurate which comprises (1) reacting one molar proportion of an aromatic diisocyanate, one molar proportion of a saturated aliphatic monohydric alcohol having an alcoholic hydroxyl group as the sole reactive group, and a catalytic amount of a tertiary amine, the foregoing reaction mixture being dissolved in an inert organic solvent, to form a urethanoaryl mono-isocyanate by the addition of said monohydric alcohol to one isocyanate group in each molecule of said diisocyanate, (2) thereafter adding to the resulting reaction mixture a catalytic amount of an epoxy compound having the formula

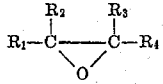

$R_1$, $R_2$, $R_3$ and $R_4$ being selected from the group consisting of hydrogen and alkyl radicals, said solvent, tertiary amine, and epoxy compound being unreactive with aromatic isocyanates under the conditions of the reaction, and allowing the resulting mixture to stand at ambient temperature, whereby a tri-(urethanoaryl) isocyanurate is formed by trimerization of the isocyanate groups in said urethanoaryl mono-isocyanate.

4. The method of claim 3 wherein the said tri-(urethanoaryl) isocyanurate is recovered from the reaction mixture and heated at a temperature and for a time sufficient to decompose the urethane groups, thereby regenerating said monohydric alcohol and forming a tri-(isocyanatoaryl) isocyanurate.

5. A method of making a high polymeric material which comprises (1) esterifying one molar proportion of a dicarboxylic acid with more than one molar proportion of a glycol to give a polyester with predominantly terminal alcoholic hydroxyl groups, (2) reacting one molar proportion of said polyester with at least two molar proportions of an aromatic diisocyanate to give an aryl diisocyanate-modified polyester with terminal isocyanate groups, (3) mixing with the modified polyester a catalyst comprising at least 0.1 mole per 100 moles of terminal isocyanate group of each of (A) an epoxy compound having the formula

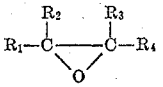

$R_1$, $R_2$, $R_3$ and $R_4$ being selected from the group consisting of hydrogen and alkyl radicals, and (B) a tertiary amine, and maintaining the mixture at a temperature of 0° C. to 50° C. until trimerization of the isocyanate groups of said modified polyester is effected, said epoxy compound and tertiary amine containing no groups reactive with aromatic isocyanates under the conditions of the reaction.

References Cited in the file of this patent
UNITED STATES PATENTS

| 2,284,637 | Catlin | June 2, 1942 |
| 2,671,082 | Stallmann | Mar. 2, 1954 |
| 2,801,244 | Balon | July 30, 1957 |
| 2,835,653 | Haas et al. | May 20, 1958 |

FOREIGN PATENTS

| 870,471 | France | Dec. 12, 1941 |
| F11,946 | Germany | June 21, 1956 |